United States Patent [19]

Hoch et al.

[11] Patent Number: 4,573,544
[45] Date of Patent: Mar. 4, 1986

[54] COOLING AIR DUCT AND SCREEN ARRANGEMENT FOR AN AIR COOLED ENGINE

[75] Inventors: John J. Hoch, Beaver Dam; David K. Stricker, Juneau, both of Wis.

[73] Assignee: Deere & Company, Moline, Ill.

[21] Appl. No.: 573,774

[22] Filed: Jan. 25, 1984

[51] Int. Cl.[4] .............................................. B60K 11/06
[52] U.S. Cl. ................................. 180/68.1; 123/41.66
[58] Field of Search ............... 46/463; 98/40 R, 40 D; 180/54.1, 68.1, 68.3; 123/41.66

[56] References Cited
U.S. PATENT DOCUMENTS

| | | | |
|---|---|---|---|
| 1,892,669 | 1/1933 | Heiney | 180/68.1 |
| 2,143,889 | 1/1939 | Ledwinka | 180/68.1 |
| 2,730,084 | 1/1956 | Stegeman | 180/68.1 X |
| 2,785,620 | 3/1957 | Welch | 180/68.1 X |
| 2,871,968 | 2/1959 | Giacosa | 180/68.1 |
| 2,966,339 | 12/1960 | Morgan | 180/68.6 X |
| 3,043,390 | 7/1962 | Lattay | 180/68.1 |
| 3,796,277 | 3/1974 | Gordon | 180/54 A |
| 3,828,952 | 8/1974 | Klee | 180/68.1 X |
| 3,946,824 | 3/1976 | Jester et al. | 180/68.1 X |
| 3,987,766 | 10/1976 | Welck | 123/41.66 |

Primary Examiner—Joseph F. Peters, Jr.
Assistant Examiner—Michael Mar

[57] ABSTRACT

A vehicle has a rear mounted, air cooled engine. The engine has a fore-and-aft crankshaft and a cooling air fan is mounted to the front end of the crankshaft for drawing air in through an inlet in the front of a shroud for the engine. A transverse, vertical baffle is mounted so that its lower edge is in sealed engagement with the top of a forward portion of the shroud. A screen is mounted to the front side of the baffle and is shaped to cooperate with the baffle to define an open bottomed cavity which leads into an air duct mounted so as to channel air from the cavity to the shroud inlet. The screen is located just rearwardly of a seat mounted on the vehicle.

7 Claims, 4 Drawing Figures

COOLING AIR DUCT AND SCREEN ARRANGEMENT FOR AN AIR COOLED ENGINE

BACKGROUND OF THE INVENTION

The present invention relates to duct and screen arrangements for assuring that relatively clean air is drawn into the shroud of an air cooled engine by the engine cooling fan.

Air cooled engines that are used in vehicles are usually either of a design including a vertical crankshaft having a cooling fan coupled to the top thereof for drawing air in through an inlet provided in the top of the engine shroud, or of a design including a horizontal crankshaft having a cooling fan coupled to an end thereof for drawing air in through a fore-and-aft opening inlet provided in the engine shroud. While various duct and screen arrangements have been applied to engines having vertical crankshafts, these arrangements are not applicable to engines having horizontal crankshafts. Examples of known duct and screen arrangements are found in U.S. Pat. No. 3,796,277 granted on Mar. 12, 1974, U.S. Pat. No. 3,987,766 granted on Oct. 26, 1976 and in U.S. patent application Ser. No. 347,121 filed on Feb. 9, 1982, now U.S. Pat. No. 4,432,309.

Now, there has been designed a duct and screen arrangement which is particularly adapted for use with air cooled engines having their crankshafts disposed horizontally.

SUMMARY OF THE INVENTION

According to the present invention there is provided a baffle and screen arrangement for use with an air cooled vehicle engine having a horizontal crankshaft.

An object of the invention is to provide an engine cooling air system including a duct and screen arrangement for ensuring that an air cooled engine draws debris-free air into its cooling shroud.

Another object of the invention is to provide an engine cooling air system which serves as a precleaner for combustion air for the engine.

A more specific object is to provide a duct and screen arrangement for use with a vehicle employing an air cooled engine having a horizontal crankshaft for the purpose of providing a source of clean air to be drawn into a shroud of the engine by a fan mounted to one end of the crankshaft.

Yet another object of the invention is to provide a simple duct and screen arrangement for ensuring that clean air is drawn into an engine cooling shroud, with the screen being easily removable for cleaning.

Another object of the invention is to provide, in conjunction with a vehicle having a rear mounted air cooled engine, an air duct and screen arrangement connecting a forwardly opening engine cooling shroud inlet to an area located rearwardly of an operator's seat of the vehicle.

Yet a more specific object is to provide a duct and screen arrangement including a vertical transverse baffle plate mounted against the top of an engine shroud forming a fan housing at the forward end of an air cooled engine, an open-topped duct mounted to the forward end of the shroud so as to be in communication with the cooling fan and a screen releasably mounted to the baffle plate and cooperating with the baffle and duct to form an enclosure.

These and other objects, features and advantages of the present invention will become apparent to those skilled in the art from the description which follows and from the drawings.

DESCRIPTION OF THE PREFERRED EMBODIMENT

Figure 1:
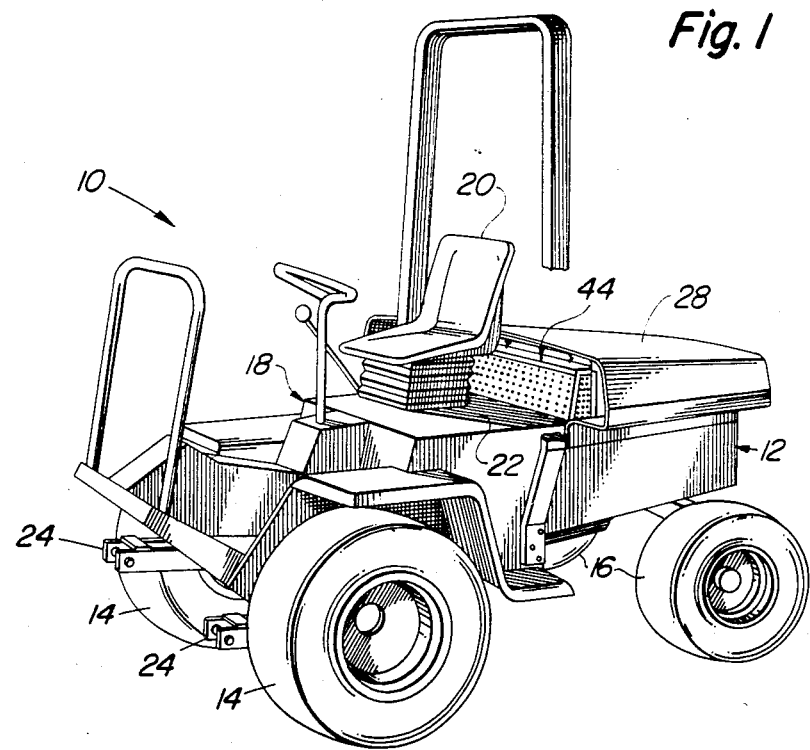
FIG. 1 is a left front perspective view of a vehicle of the type with which a cooling air system constructed in accordance with the present invention is particularly adapted for use.

Referring now to FIG. 1, there is shown a vehicle 10 including a main frame 12 comprising a pair of transversely spaced, fore-and-aft beams 13 (FIG. 2) and being supported by a pair of front drive wheels 14 and a pair of rear steerable wheels 16. An operator's platform 18 is carried by the frame 12 and extends rearwardly from the front of the vehicle to a location roughly midway between the front and rear pairs of wheels 14 and 16. An operator's seat 20 is mounted to a raised flat area 22 forming the rear of the platform. Located at the forward end of the vehicle 10 is a pair of forwardly extending hitch arms 24 which are adapted for being coupled to an implement such as a rotary mower or the like. Mounted to the frame beams 13 rearwardly of the operator's platform 18 is an engine 26 (FIGS. 2 and 3) and covering the engine is a hood 28. The rear end of the hood 28 is preferably coupled to the frame 12 by a horizontal transverse hinge structure (not shown) for permitting the hood to be swung upwardly about the hinge axis so as to expose the engine and other components for servicing, maintenance, etc.

Figure 2:
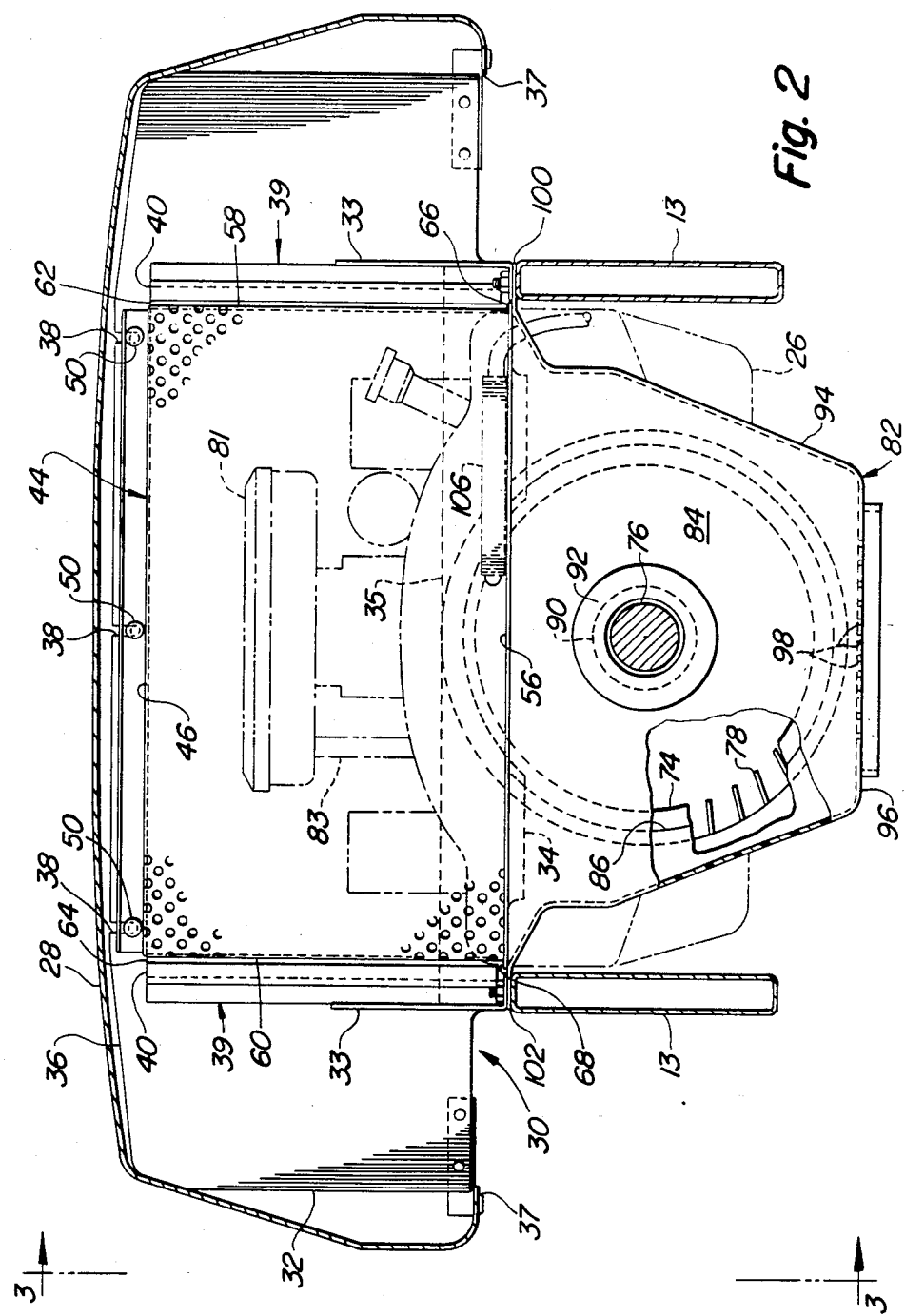
FIG. 2 is a vertical sectional view taken along line 2—2 of FIG. 3 and showing various components of the cooling air system.
Figure 3:
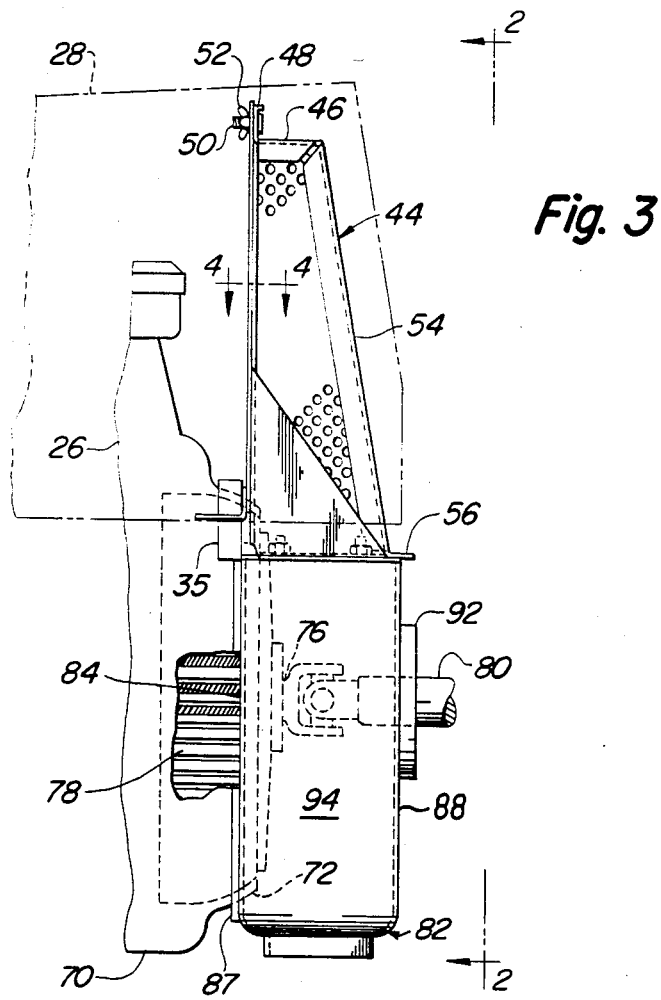
FIG. 3 is a right side elevational view taken along 3—3 of FIG. 2, but omitting the vehicle frame and showing the hood in phantom for clarity.
Figure 4:
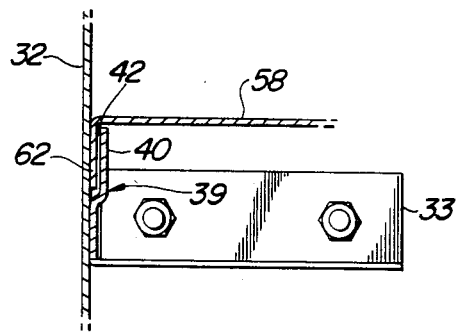
FIG. 4 is a horizontal sectional view taken along line 4—4 of FIG. 3 and showing the flange connection between the screen and the baffle.

Referring now also to FIGS. 2-4, it can be seen that an air cooling system 30 is provided which includes a vertical sheet metal baffle 32 extending transversely across the beams 13 at a location behind the seat 20 and having a pair of transversely spaced brackets 33 welded thereto and bolted to the frame beams 13. The baffle 32 has a lower edge 34 shaped to fit the upper profile of the engine 26 and an elongated block of resilient foam material 35 is bonded to the rear side of the baffle for sealing any gap existing between the edge 34 and the engine. As viewed from its forward end, the hood 28 is generally inverted U-shaped which shape approximates that of a top edge 36 of the baffle 32. The hood 28 engages at least a portion of the edge 36 when the hood is closed and secured to the baffle at opposite lower end connections 37 as shown in FIG. 2. Located in the edge 36 at locations inwardly of the beams 13 are three equispaced vertical notches or slots 38. A pair of vertical guides 39, of which the brackets 33 are a part, are welded to a forwad surface of the baffle 32 respectively in general vertical alignment with the pair of beams 13. The guides 39 are each in the form of a narrow strap having a portion 40 offset from the baffle so as to cooperate therewith and form a slot 42 extending the length of the guide.

The notches or slots 38 and the guides 39 cooperate in the mounting of a screen 44. Specifically, the screen 44 includes a horizontal, rectangular top 46 having a vertical flange 48 secured along the rear edge thereof. Three threaded studs 50 project rearwardly from the flange and are respectively received in the notches or slots 38 of the baffle 32. Wing nuts 52 are received on the studs 50. The screen 44 further includes a rectangular front 54 which angles downwardly and forwardly from a forward edge of the top 46 and terminates at a forwardly extending horizontal flange 56. Right and left vertical sides 58 and 60 respectively connect the right and left ends of the top 46 and front 54. The sides 58 and 60 have rear edges which terminate in vertical outturned flanges 62 and 64 which are received in the guides 39. The sides 58 and 60 have bottom edges which terminate in respective horizontal outturned flanges 66 and 68 which are coplanar with the flange 56.

The engine 26 is of an air cooled type having a cooling shroud 70 defining a somewhat conical forward end portion 72 having a forwardly opening air inlet 74 therein disposed concentrically relative to a forward end of a horizontal, fore-and-aft extending crankshaft 76. A fan 78 is mounted on the crankshaft 76 and is located within the shroud end portion 72. A power takeoff shaft 80 is connected to the forward end of the crankshaft 76. A combustion air cleaner 81 is located centrally behind the baffle 32 and a hose 83 extends between the cleaner 81 and the shroud 72 so as to convey a source of precleaned air from the shroud to the cleaner, as is made more apparent from the following description.

An air duct 82 for guiding cooling air into the inlet 74 is mounted against the shroud end portion 72. Specifically, the duct 82 includes a vertical rear wall 84 having a partial circular opening 86 therein of a size slightly larger than the inlet 74. The shroud portion 72 is partly received in the opening 86 and abuts a seal 87 carried by the duct wall 84. The duct 82 further includes a forward wall 88 which is substantially parallel to the wall 84 and contains a circular opening 90 receiving the power takeoff shaft 80. A resilient block 92 is bonded to the wall 88 in sealing relationship to a clearance gap existing between the shaft 80 and the opening 90. The opposite side edges of each of the walls 84 and 88 converge downwardly and are connected by a horizontal bottom edge. A connecting wall 94 joins the edges of these walls and includes a horizontal bottom portion 96 which is provided with a plurality of drain holes 98 to ensure that water does not collect in the duct 82. The upper ends of the opposite sides of the connecting wall 94 form oppositely extending, horizontal mounting tabs 100 and 102 which respectively overlie and are bolted to the frame beams 13 with the same bolts which secure the baffle brackets 33 to the beams. The tabs 100 and 102 are coplanar with upper edges of the walls 84 and 88 and the horizontal, coplanar flanges 56, 66 and 68 of the screen 44 tightly engage the tabs and wall upper edges so as to prevent unscreened air from entering the shroud.

An oil cooler 106 is mounted forwardly of the baffle 32 and within the confines of the screen and duct combination. Thus, the oil cooler is located in a relatively clean environment and in that way its cooling fins are kept from becoming clogged with airborne debris.

In operation, the vehicle 10 will normally be coupled to an implement, such as a rotary mower, for example. The cooling system 30 is arranged for drawing in air from a location behind the seat 20, the air at that location normally being relatively free of airborne debris. In any event, the cooling fan 78 operates to draw air into the engine shroud 70 by way of the screen 44 and duct 82. Should any debris be present in the air being drawn in, it will be stopped by the screen 44. If the screen 44 becomes covered with an amount of debris which significantly affects engine cooling, the screen 44 may be easily removed by loosening the wing nuts 52 and withdrawing the screen from the guides 39.

Further, the cooling system 30 will act to preclean the air supplied to the air cleaner 81 by way of the hose 83 for use in the combustion process by the engine 26.

We claim:

1. In combination with a vehicle including a fore-and-aft extending main frame, an operator's station located about midway between opposite ends of the frame, and air cooled engine mounted to the frame at a location behind the station and including a cooling shroud having a forwardly disposed inlet located at a level below said station, and a hood extending over said engine and having an inverted U-shaped forward end terminating at a location forwardly of said cooling shroud, an improved cooling air system for ensuring a supply of relatively clean air for ingestion by the shroud, comprising: a vertical transverse baffle mounted to the frame and fitting closely against a forward top portion of the shroud and having an edge shaped complementary to and disposed at least closely adjacent the hood; an air duct mounted to the frame and having an upright rear wall seated against the front of the shroud in an area surrounding said inlet; said air duct further having an upright front wall and a connecting wall joining respective side and bottom edges of the front and rear walls and cooperating therewith to define an upwardly facing opening; a screen located forwardly of the baffle and having a top and front joined by opposite sides with the top and opposite sides having rear edges mounted against said baffle and with the opposite sides and front having bottom edges engaged with said air duct about said upwardly facing opening wherein said screen is mounted solely to said baffle by connection means including a vertical guide means provided on the forward side of said baffle and flange means formed on said screen and being vertically slidably received in said guide means, whereby said screen may be slid vertically away from said baffle for being cleaned.

2. The combination defined in claim 1 wherein said connection means further includes a plurality of slots provided at spaced locations across an upper edge of said baffle; a plurality of threaded studs being fixed to a rear edge of the top of said screen, and a plurality of wing nuts respectively received on said studs.

3. The combination defined in claim 1 wherein said main frame includes a pair of laterally spaced, fore-and-aft extending beams and said baffle and air duct each being releasably secured to said beams.

4. The combination defined in claim 3 wherein said baffle has a pair of vertical guide tracks respectively located in vertical alignment with said pair of beams and said screen having opposite vertical sides formed into vertical flanges respectively vertically slidably received in said pair of guide tracks.

5. The combination defined in claim 1 wherein said connecting wall forms a bottom of said duct, and said bottom containing at least one drain hole.

6. The combination defined in claim 1 and further including an oil cooler mounted within said enclosure.

7. The combination defined in claim 1 wherein said engine includes an air cleaner; and a hose being connected between the interior of the engine shroud and the air cleaner for supplying combustion air to the engine.

* * * * *